United States Patent
Heikkila et al.

[11] Patent Number: 6,106,944
[45] Date of Patent: Aug. 22, 2000

[54] FIBER THERMOSET REINFORCED THERMOPLASTIC STRUCTURAL MEMBER

[75] Inventors: Kurt E. Heikkila, Circle Pines; Anthony L. Garofalo, St. Paul, both of Minn.

[73] Assignee: Andersen Corporation, Bayport, Minn.

[21] Appl. No.: 08/890,693

[22] Filed: Jul. 11, 1997

Related U.S. Application Data

[63] Continuation-in-part of application No. 08/686,805, Jul. 26, 1996, Pat. No. 5,585,155.

[51] Int. Cl.[7] .............................. B29C 35/06; B32B 1/08; B44C 5/08
[52] U.S. Cl. .......................... 428/397; 428/98; 428/105; 428/106; 428/107; 428/108; 428/109; 428/113
[58] Field of Search ...................... 428/373, 374, 428/397, 36.7, 34.1, 36.3, 36.6, 36.9, 36.91, 98, 105, 106, 107, 108, 109, 113

[56] References Cited

U.S. PATENT DOCUMENTS

| | | | |
|---|---|---|---|
| 3,769,127 | 10/1973 | Goldsworthy et al. | 158/172 |
| 4,515,737 | 5/1985 | Karino et al. | 264/22 |
| 4,740,405 | 4/1988 | Tanaka et al. | 428/45 |
| 4,938,823 | 7/1990 | Balazek et al. | 156/155 |
| 5,030,408 | 7/1991 | Hirao et al. | 264/328.5 |
| 5,120,380 | 6/1992 | Sirachan | 158/164 |
| 5,585,155 | 12/1996 | Heikkila et al. | |

*Primary Examiner*—Richard Weisberger
*Attorney, Agent, or Firm*—Merchant & Gould P.C.

[57] ABSTRACT

In the manufacture of a structural member comprising a thermoplastic composite core with an exterior reinforcing layer, the core member is initially extruded in the shape of a profile. The profile is then contacted with reinforcing fiber and resin to form the exterior reinforcing layer. The exterior thermosetting layer is cured to form a reinforcing layer. The structural member is preferably manufactured using a pultrusion method in which a tractor device is used to provide linear movement of the profile from the extrusion head to the exterior coating operation. The fiber-reinforced thermoset is coated on the entirety of the exterior of the profile or is applied only on a portion of the profile requiring reinforcement in a defined load-bearing direction. A preferred thermoplastic core comprises a polymer-fiber composite material. A structural member of the invention has significantly improved Young's modulus providing strength for applications such as telephone poles, electric poles, electric lighting poles, boat mast or keel applications, lumber replacements, structural members used in window and door manufacture, etc.

26 Claims, 2 Drawing Sheets

FIBER THERMOSET REINFORCED THERMOPLASTIC STRUCTURAL MEMBER

The present patent application is a continuation-in-part of U.S. Ser. No. 08/686,805, filed Jul. 26, 1996, now U.S. Pat. No. 5,585,155, the disclosure of which is included herein by reference.

FIELD OF THE INVENTION

The invention relates to shaped (non-circular) fiber-reinforced structural members. More particularly, the invention relates to fiber-reinforced structural members having an exterior fiber-reinforced thermoset layer formed on a thermoplastic profile. Such reinforced profiles have a variety of useful cross-sectional shapes having acceptable mechanical strength for high structural loading. The invention also relates to a pultrusion method of forming such a structural member involving an extrusion die for the formation of a thermoplastic profile comprising a thermoplastic composite. The process further involves forming an uncured layer of fiber and thermosetting resin on the profile exterior which can be cured to form the reinforced structural member. The useful shapes of the profile can be complex for specific application in window/door manufacture, automotive, aviation, I beam and C-channel, and other applications as structural members. Further, the invention also relates to structural units using the fiber-reinforced structural member for increased strength.

BACKGROUND OF THE INVENTION

A great deal of attention has been directed to the fabrication or manufacture of structural members that can withstand substantial structural loads and varying temperatures arising in the natural environment. In certain arid desert areas, average daily temperatures can reach 100° F. or more. Most common structural members comprise a support structure using either metallic structures manufactured from aluminum, steel, stainless steel metallic fiber or other high strength metallic material. Further, large structural wooden members have been used in utility poles, bridge components, housing structures and other similar units. Such wooden and metallic structural members have had some substantial success.

Increasing attention has also been given to the manufacture of structural members from thermosetting and thermoplastic materials. Processing these materials offers improved manufacturing properties because of the ease of processing thermosetting and thermoplastic resins and combining those materials with reinforcing fibers.

Karino et al., U.S. Pat. No. 4,515,737 teach a process for producing a composite circular pipe. In the process, a thermoplastic resin pipe is formed using an extruder. The surface of the pipe is covered with a uniform layer comprising continuous fibrous reinforcing material impregnated with a thermosetting resin in its axial direction by a draw molding method, helically winding a continuous fibrous reinforcing material impregnated or not impregnated with a thermosetting resin uniformly on the initial resin fibrous reinforced layer. The Karino et al. material has a polyvinyl chloride pipe center and a first and second fibrous reinforcing layer. This process, using a wrapped layer, cannot be used for complex profile shapes.

Tanaka et al., U.S. Pat. No. 4,740,405 teach an extruded profile or frame member comprising a thermoplastic resin having reinforcing wires throughout the frame member joined using a thermosetting resin. The fibers are typically dispersed within the profile material.

Balazek et al., U.S. Pat. No. 4,938,823 teach a pultrusion/extrusion method in which continuous transit or longitudinal fiber or roving is coated with a thermosetting resin. The fibers are then combined with one or more fibrous reinforcing mats and pass through a second die to cure the thermosetting resin. This process forms a first profile. The surface of the substantially cured thermoset is then deformed and a thermoplastic resin is then applied to the deformed surface. The deformity in the thermosetting surface provides increased adhesion between the thermoset core and the thermoplastic exterior.

Hirao et al., U.S. Pat. No. 5,030,408 teach a method of forming a molded resin article combining both thermoplastic and thermosetting resins in a kneader extruder to form the article. The structures manufactured by agglomerating thermoplastic materials having a particle diameter of 0.05–0.5 $\mu$m with particles of 10–1000 $\mu$m diameter prior to kneading, then introducing the thermoplastic material into the kneader.

Strachan, U.S. Pat. No. 5,120,380 teaches a method of forming extruded profiles. In the process, cloth, preferably woven fiberglass is delivered by supply rolls and guided over the external profiled surface of a forming duct. The cloth is maintained in a shape by an air stream provided by a venturi blower. The air stream blows towards the die and at least partially diffuses through the cloth prior to the resin curing die. The air shaped cloth runs into a curing die where it is impregnated with a thermosetting resin. The thermosetting resin is cured into an extruded profile which is then withdrawn from the curing station using a pultrusion tractor device. The prior art shows a variety of thermoplastic/thermosetting composite materials that can be used as structural members. No one structure or method appears to be superior in forming structural members that can resist high structural loads in the varying temperatures found in the natural environment. Substantial need exists for improving the heat distortion temperature of composite structures.

BRIEF DISCUSSION OF THE INVENTION

The structural member of the invention comprises a core thermoplastic noncircular profile having at least a covering comprising a fiber reinforced thermosetting layer. According to the invention, the core may or may not be fiber reinforced. In some preferred embodiments the thermoplastic core is fiber reinforced.

The structural member can be manually laid up or made in a continuous pultrusion process. We have also found that the very high strength structural members can be manufactured by extruding a thermoplastic core, carefully calibrating the exterior of the core to form a core shape, covering the core with a thermoset resin fiber reinforced layer, shaping the exterior layer to calibrate the exterior shape and curing the exterior layer to form the final structural member. Such a process can be incorporated in a pultrusion method in which a tractor device is used to provide movement of the member through the process. A tractor device can contact the device after the fiber reinforced thermoset layer is calibrated, cured and cooled into a final structural member. An optional tractor device can be installed in a place such that it can directly contact the thermoplastic extrudate after calibration and cooling, but just prior to coating with the fiber reinforced thermoset. In the process, the cooled, calibrated, thermoplastic composite acts as a forming mandrel for the thermosetting layer. A fiber reinforced thermoplastic core is preferred for some applications due to the substantially improved structural properties. In other applications, a non-reinforced thermoplastic core is suitable. When adhered to the fiber reinforced thermoset in a structural member, the thermoplastic core cooperates to result in substantially improved mechanical properties and in particular, substantially improved heat distortion temperatures when used in a structural member under substantial load at high temperatures.

We have found that the fiber reinforced thermosetting layer has a substantially higher heat distortion temperature than non-fiber reinforced thermoplastics. In particular, a fiber reinforced polyvinyl chloride layer has a sufficiently higher heat distortion temperature than the non-reinforced thermoplastic such that an extruded fiber reinforced polyvinyl chloride can act as a moving mandrel in a manual or continuous process for making the structural members of the invention. Substantially complex shapes having a substantial quantity of both thermoplastic core material and reinforced thermosetting material can be used in forming the structural member of the invention (even in the presence of substantial amounts of force in shaping the structure using a die or vacuum forming device) without any substantial change to the shape, wall thickness or structural integrity of the fiber reinforced thermoplastic core structure.

The structural components of the invention can be used in the form of I-beams, C-channel, reinforced panels, rails, jambs, stiles, sills, tracks, stop and sash. The structural components of the invention can be heated and fused to form high strength welded joints in window and door assembly.

DETAILED DISCUSSION OF THE INVENTION

Figure 1:
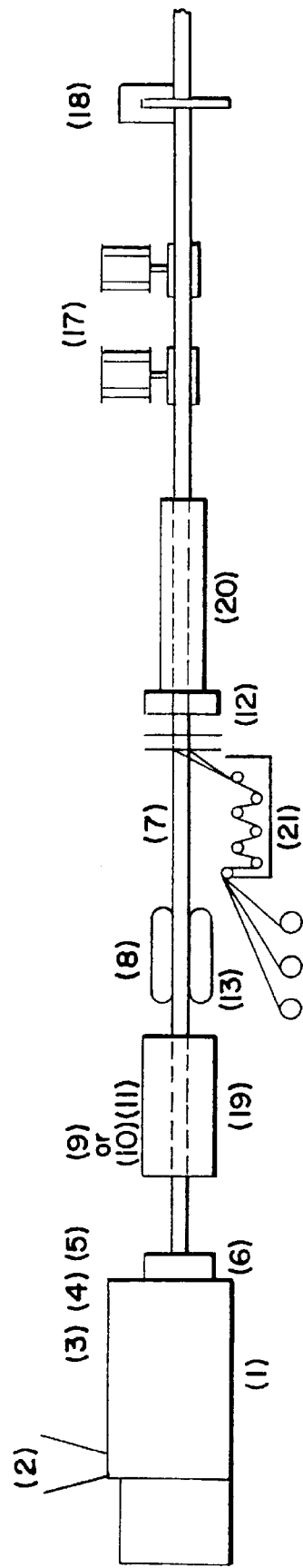
FIG. 1 is a representation of a continuous process of the invention producing the reinforced members.

The composite structural member of the invention comprises a thermoplastic linear extruded core. In one embodiment, the linear extruded core comprises a thermoplastic polymer composition. In an alternative embodiment, the extruded core member can comprise a thermoplastic polymer composite composition manufactured by intimately combining a thermoplastic polymer and a fiber material. In either embodiment of the core, a preferred polymer comprises polyvinyl chloride. In a preferred composite core, the polymer comprises a polyvinyl chloride polymer and the fiber comprises a cellulosic fiber.

The exterior reinforcing layer can cover a portion or all of the composite structural member and can comprise fiber and a thermosetting resin. The fiber can be applied in the form of fiber, fabric, rovings, yarn, thread, or other common fiber application forms. The fiber can be applied linearly along the extrudate or can be wrapped at any angle to the extruded linear member in a generally circular motion.

In the practice of a process for forming the structural members of the invention, the thermoplastic polymer is melted and extruded through a profile die or orifice to form a rough profile shape. The profile can be solid or hollow. The hollow profile can have a wall thickness of about 1 mm to 10 cm or larger if needed. The rough profile shape is then carefully calibrated in a sizing device which also cools the extrudate to form an extrudate with a carefully defined profile shape. The thermosetting resin and fiber are then applied to the exterior of the cooled shaped profile and cured to form a reinforcing layer. The thickness of the reinforcing layer can be about 0.5 mm to about 3 cm or larger if needed. The resin and fiber can also be passed through a calibration die to shape the resin and fiber prior to and during curing to regulate and fix the exterior dimensions of the structural member. In a preferred pultrusion method of the invention, a tractor device can be installed after the shaping and cooling die to pull the extruded thermoplastic linear member from the extrusion die through the cooling and sizing device. The pultrusion tractor device can be installed after the curing station forming the thermosetting fiber reinforced layer. Preferably, the process is run using a tractor to pull the completed reinforced member from the curing die. This tractor can be sized to provide all force needed to produce the part.

In certain applications where stress is typically directed onto the member in a specific or defined stress load direction, the fiber reinforcement can be applied only to an area of the profile positioned to support the entire directional load of the stress. Alternatively, the entire surface of the profile can be covered with fiber reinforcement.

Thermoplastic Core

Thermoplastic materials suitable for a fiber reinforced or non-fiber reinforced core according to the invention include, for example, both condensation polymeric materials and vinyl polymeric materials. Included are both vinyl and condensation polymer resins, and alloys thereof, such as acrylonitrile-butadiene-styrene (ABS), polyacetyl resins, polyacrylic resins, fluorocarbon resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials. Vinyl polymers are typically manufactured by the polymerization of monomers having an ethylenically unsaturated olefinic group. Condensation polymer resins are typically prepared by a condensation polymerization reaction which is typically considered to be a stepwise chemical reaction in which two or more molecules combined, often but not necessarily accompanied by the separation of water or some other simple typically volatile substance. If a polymer is formed, the process is called polycondensation. A preferred thermoplastic for a thermoplastic core of the invention is polyvinyl chloride.

Exterior Layer Comprising a Fiber-Reinforced Thermoset

In the structural members of the application, an exterior layer is formed on the thermoplastic core comprising a fiber-reinforced thermoset. Such an exterior layer is formed using a thermosetting resin. A variety of thermosetting resins are known for use in such applications. Such thermosetting resins include unsaturated polyester resins, phenolic resins, epoxy resins, high-performance epoxy resins, bismaleimides including modified bismaleimides such as epoxy modifications, biscyanate modifications, rubber-toughened bismaleimides, thermoplastic-toughened bismaleimides, and others. In the practice of this invention, the preferred resins comprise unsaturated polyester resins, phenolic resins and epoxy resins.

Polyester resins are manufactured by the reaction of a dibasic acid with a glycol. Dibasic acids used in polyester production are phthalic anhydride, isophthalic acid, maleic acid and adipic acid. The phthalic acid provides stiffness, hardness and temperature resistance; maleic acid provides vinyl saturation to accommodate free radical cure; and adipic acid provides flexibility and ductility to the cured resin. Commonly used glycols are propylene glycol which reduces crystalline tendencies and improves solubility in styrene. Ethylene glycol and diethylene glycol reduce crystallization tendencies. The diacids and glycols are condensed eliminating water and are then dissolved in a vinyl monomer to a suitable viscosity.

Vinyl monomers include styrene, vinyltoluene, paramethylstyrene, methylmethacrylate, and diallyl phthalate. The addition of a polymerization initiator, such as hydroquinone, tertiary butylcatechol or phenothiazine extends the shelf life of the uncured polyester resin. Resins based on phthalic anhydride are termed orthophthalic polyesters and resins based on isophthalic acid are termed isophthalic polyesters. The viscosity of the unsaturated polyester resin can be tailored to an application. Low viscosity is important in the fabrication of fiber-reinforced composites to ensure good wetting and subsequent high adhesion of the reinforcing layer to the underlying substrate. Poor wetting can result in large losses of mechanical properties. Typically, polyesters are manufactured with a styrene concentration or other monomer concentration producing resin having an uncured viscosity of 200–1,000 mPa.s(cP). Specialty resins may have a viscosity that ranges from about 20 cP to 2,000 cP. Unsaturated polyester resins are typically cured by free radical initiators commonly produced using peroxide materials. A wide variety of peroxide initiators are available and are commonly used. The peroxide initiators thermally decompose forming free radical initiating species.

Phenolic resins can also be used in the manufacture of the structural members of the invention. Phenolic resins typically comprise a phenol-formaldehyde resin. Such resins are inherently fire resistant, heat resistant and are low in cost. Phenolic resins are typically formulated by blending phenol and less than a stoichiometric amount of formaldehyde. These materials are condensed with an acid catalyst resulting in a thermoplastic intermediate resin called NOVOLAK. These resins are oligomeric species terminated by phenolic groups. In the presence of a curing agent and optional heat, the oligomeric species cure to form a very high molecular weight thermoset resin. Curing agents for novalaks are typically aldehyde compounds or methylene ($-CH_2-$) donors. Aldehydic curing agents include paraformaldehyde, hexamethylenetetraamine, formaldehyde, propionaldehyde, glyoxal and hexamethylmethoxy melamine.

Epoxy resins are also used in forming thermoset-reinforcing layers. Typical epoxy resin systems are based on an oxirane reaction with an active hydrogen. Epoxy resins are generally characterized as oligomeric materials that contain one or more epoxy (oxirane) groups per molecule. The value of epoxy resins relates to their ease of processing into a variety of useful products or shapes including coatings, structural components of a variety of shape and size. Epoxy groups in the resin are cured with an appropriate curing agent, typically an amine. A variety of commercially available epoxy resins based on phenol, bisphenol, aromatic diacids, aromatic polyamines and others are well known. Specific examples of available commercial resins include a phenolic novolak epoxy resin, glycidated polybasic acid, glycidated polyamine (N, N, N', N'-tetraglycidyl-4,4'-diamino diphenyl methane) and glycidated bisphenol A oligomers. Epoxy resins are cured into useful products using curing or cross linking chemical agents. Two principal classes of curing agents used in epoxy resins for advanced composite materials are aromatic diamines and acid anhydrides. Such materials include M-phenylenediamine; 4,4'-methylene dianiline; 4,4'-diaminodiphenyl sulfone; Nadic Methyl Anhydride; hexahydrophthalic anhydride; methyltetrahydrophthalic anhydride and others.

Fiber-reinforcing materials that can be used in the structural members of the invention typically include high strength fibers such as carbon fibers, glass fibers, aramid fibers, steel fibers, boron fibers, silicon carbide fibers, polyethylene fibers, polyimide fibers and others. Such fibers can be used in the form of a single filament, a multifilament thread, a yarn, a roving, a non-woven fabric or a woven fabric material. The fiber, roving, yarn or fabric can be applied linearly along the profile or wrapped, or otherwise formed on the profile in an appropriate pattern that can be cured to form the reinforcing structure.

Strachan, U.S. Pat. No. 5,120,380, teaches an in-line manufacture of fiber filled pultruded profiles. The Strachan technology involves forming hollow profiles using a long heated mandrel which can be filled with foam. Strachan uses a driven air blast to maintain a hollow uncured member to prevent collapse of the profile and to maintain its shape during curing. This process is slow, requires long support mandrels shaped to the required hollow profile and limits the practicality of producing some profiles at economical rates.

The process of the invention uses a continuously extruded and cooled profile as a mandrel upon which resin and fiber or strips of reinforced media are applied to the mandrel/extrudate. The use of the extrudate as a mandrel substantially increases throughput, provides an accurate gauge of sizing rapid economical throughput. Further, the process allows for greater thickness range of the resulting structural member, increased production rates, flexibility in placement of reinforcing materials, thermally or vibrationally weldable profiles, permits the inclusion of "foamed-in-place" areas to facilitate screw, nail or other fastener retention, has added strength over other reinforced media due to a synergistic bonding between the core and the reinforcing layer. The characteristics of the preferred thermoplastic fiber composite core highlighted in the improved physical properties including a high heat distortion temperature (HDT) in excess of 100° C., a Young's modulus or specific modulus in excess of 500,000 psi preferably greater than 1,000,000 psi and an elongation at break of less than 3% and commonly between 1 and 3%, a tensile strength of greater than 6,500 psi.

Method

FIG. 1 shows the general method. Pellets of FIBREX™ a PVC/wood fiber composite of about 60 parts PVC and 40 parts wood fiber are fed into an extruder (1) via the extruder throat (2). The pellets are heated, mixed and compressed in the extruder barrel (3), and then pushed via the extruder screw (4) through an adapter (5) and then a shaped die (6). On exiting the die, the profile (7) is pulled by a puller (8) through a series of vacuum sizers (9) or vacuum box (10) with integral sizing plates (11). The vacuum sizers (9) and/or vacuum box (10) spray water (19) onto the profile to reduce its temperature to below the H.D.T. of FIBREX™. This temperature is not to be construed as critical since those familiar with the art will recognize temperature variations as being part of the running process truly relevant to each profile.

From the profile puller (8) the profile (7) is fed through a pultrusion die (20).

At the same time, continuous strands of fiber (13) are soaked in a thermoset resin by being pulled through a wetting bath (21) and then through the pultrusion die (20). This process forms a bond between the FIBREX™ center mandrel and the reinforced thermoset resin.

Those familiar with the art will recognize the possibility of substituting woven cloth for strands should the profile design so require it.

Prior to entering the die (20) the resin wetted fibers are subjected to heating by—but not limited to—R.F. waves (12) to facilitate curing. Upon exiting the pultrusion die (20)

the profile is fully shaped and cured. Dies (20 & 6) are heated and such heats are controlled to produce the desired profiles and affect the rate of production.

The cured profile is pulled from the pultrusion die by a second puller (17) and then cut to length (18).

The method described with reference to FIG. 1, can also be used to manufacture a non-fiber reinforced thermoplastic core. According to this embodiment, thermoplastic, pellets, chips, or particles are fed into the extruder (1) via the extruder throat. The remainder of the process is as described for extruding a PVC/wood fiber composite.

Figure 2:
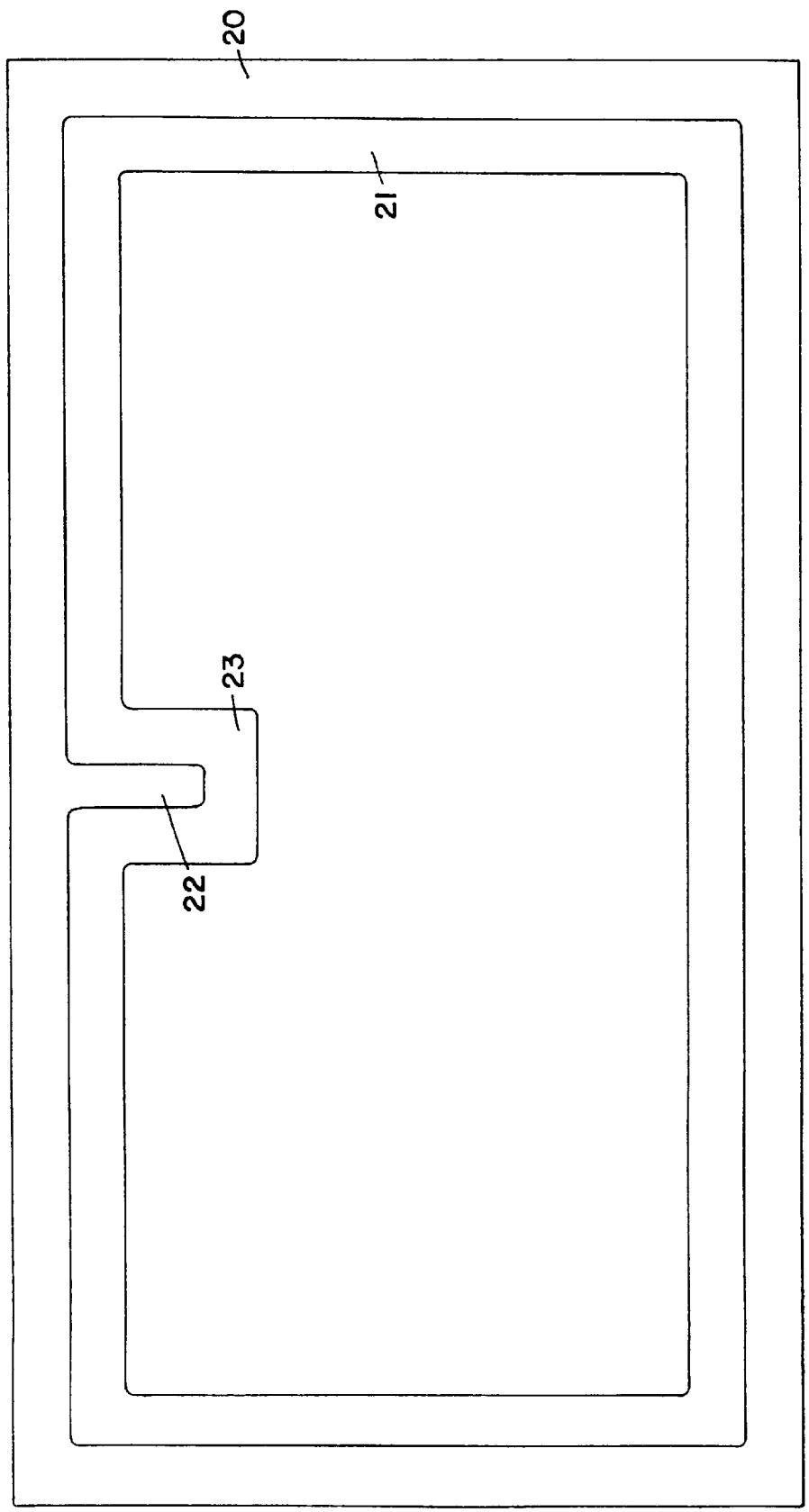
FIG. 2 is a cross-sectional view of a complex shape structural member of the invention. Such a complex shape can be manufactured using the process of the invention.

FIG. 2 shows a cross-section of a structural member of the invention. The structural member includes a thermoplastic (or fiber reinforced thermoplastic) layer 21 covered by a fiber reinforced thermosetting layer 20. The thickness of these layers typically ranges from about 0.1 to about 0.3 inches. The structural member is in the form of a relatively complex profile shape, generally rectangular, having dimensions of about 1–3 inches×2–4 inches. The core thermoplastic mandrel shape has a complex structure 23 which represents a variety of complex shapes that can be introduced into a load bearing structural member. The fiber reinforced thermosetting layer 20 is introduced into a channel in the thermoplastic layer. The material is fully contacted with the interior of channel 23 without the formation of any substantial bubbles or voids. Such complex shapes can add to both the utility of a structural member in a particular application or can add structural engineering properties to the overall member.

The structural members of this invention are fiber-thermoset reinforced polymer or fiber reinforced polymer extrusions having a useful cross-sectional shape that can be adapted to any structural application in construction of buildings, cars, airplanes, bridges, utility poles, etc. The members can be used in window or door construction and the installation of useful window components or parts into the structural member. The structural member can be an extrusion in the form or shape of rail, jamb, stile, sill, track, stop or sash. Additionally, non-structural trim elements such as grid, cove, quarter-round, etc., can be made. The extruded or injection molded structural member comprises a hollow cross-section having a rigid exterior shell or wall, at least one internal structural or support web and at least one internal structural fastener anchor. The shell, web and anchor in cooperation have sufficient strength to permit the structural member to withstand normal wear and tear related to the operation of the window or door. Fasteners can be used to assemble the window or door unit. The fasteners must remain secure during window life to survive as a structural member or component of the residential or commercial architecture. We have further found that the structural members of the invention can be joined by fusing mating surfaces formed in the structural member at elevated temperature to form a welded joint having superior strength and rigidity when compared to prior art wooden members.

The interior of the structural member is commonly provided with one or more internal structural webs which in a direction of applied stress supports the structure. Structural web typically comprises a wall, post, support member, or other formed structural element which increases compressive strength, torsion strength, or other structural or mechanical property. Such structural web connects the adjacent or opposing surfaces of the interior of the structural member. More than one structural web can be placed to carry stress from surface to surface at the locations of the application of stress to protect the structural member from crushing, torsional failure or general breakage. Typically, such support webs are extruded or injection molded during the manufacture of the structural material. However, a support can be post added from parts made during separate manufacturing operations.

The internal space of the structural member can also contain a fastener anchor or fastener installation support. Such an anchor or support means provides a locus for the introduction of a screw, nail, bolt or other fastener used in either assembling the unit or anchoring the unit to a rough opening in the commercial or residential structure. The anchor web typically is conformed to adapt itself to the geometry of the anchor and can simply comprise an angular opening in a formed composite structure, can comprise opposing surfaces having a gap or valley approximately equal to the screw thickness, can be geometrically formed to match a key or other lock mechanism, or can take the form of any commonly available automatic fastener means available to the window manufacturer from fastener or anchor parts manufactured by companies such as Amerock Corp., Ill. Tool Works and others.

The structural member of the invention can have pre-molded paths or paths machined into the molded thermoplastic composite for passage of door or window units, fasteners such as screws, nails, etc. Such paths can be counter sunk, metal lined, or otherwise adapted to the geometry or the composition of the fastener materials. The structural member can have mating surfaces premolded in order to provide rapid assembly with other window components of similar or different compositions having similarly adapted mating surfaces. Further, the structural member can have mating surfaces formed in the shell of the structural member adapted to moveable window sash or door sash or other moveable parts used in window operations.

The structural member of the invention can have a mating surface adapted for the attachment of the weigh subfloor or base, framing studs or side molding or beam, top portion of the structural member to the rough opening. Such a mating surface can be flat or can have a geometry designed to permit easy installation, sufficient support and attachment to the rough opening. The structural member shell can have other surfaces adapted to an exterior trim and interior mating with wood trim pieces and other surfaces formed into the exposed sides of the structural member adapted to the installation of metal runners, wood trim parts, door runner supports, or other metal, plastic, or wood members commonly used in the assembly of windows and doors.

Using extrusion methods a pellet and extruding the pellet into a structural member, an extruded piece as shown in FIG. 2, extrusion 20 was manufactured. The wall thickness of any of the elements of the extrudate was about 0.165 inches.

A Cincinnati Millicon extruder with an HP barrel, a Cincinnati pelletizer screws, and AEG K-20 pelletizing head with 260 holes, each hole having a diameter of about 0.0200 inches was used to make a pellet. In one embodiment, the input to the pelletizer comprises approximately 60 wt-% polymer and 40 wt-% sawdust. The polymer material comprises a thermoplastic mixture of approximately 100 parts of vinyl chloride homopolymer, about 15 parts titanium dioxide, about 2 parts ethylene-bis-stearimide wax lubricant, about 1.5 parts calcium stearate, about 7.5 parts Rohm & Haas 980-T acrylic resin impact modifier/process aid and about 2 parts of dimethyl tin thioglycolate. The sawdust input comprises a wood fiber particle containing about 5 wt-% recycled polyvinyl chloride having a composition substantially identical to the polyvinyl chloride recited above. The initial melt temperature of the extruder was maintained between 375° C. and 425° C. The pelletizer was operated on a vinyl/sawdust combined ratio through put of about 800 pounds/hour. In the initial extruder feed zone, the barrel temperature was maintained between 215–225° C. In the intake zone, the barrel was maintained at 215–225° C., and the compression zone was maintained at between 205–215° C. and in the melt zone the temperature was maintained at 195–205° C. The die was divided into three zones, the first zone at 185–195° C., the second zone at 185–195° C. and in the final die zone 195–205° C. The pelletizing head was operated at a setting providing 100–300 rpm resulting in a pellet with a diameter of about 5 mm and a length as shown in the following Table.

In a similar fashion the core is extruded from a vinyl wood composite pellet using an extruder within an appropriate extruder die. The melt temperature of the input to the machine was 390–420° F. A vacuum was pulled on the melt mass of no less than 3 inches mercury. The melt temperatures through the extruder was maintained at the following temperature settings:

Barrel Zone No. 1—220–230° C.
Barrel Zone No. 2—220–230° C.
Barrel Zone No. 3—215–225° C.
Barrel Zone No. 4—200–210° C.
Barrel Zone No. 5—185–195° C.
Die Zone No. 6—175–185° C.
Die Zone No. 7—175–185° C.
Die Zone No. 8—175–185° C.

The screw heater oil stream was maintained at 180–190° C. The material was extruded at a line speed maintained between 5 and 7 ft./min.

EXPERIMENTAL

SHOP ORDER: MANUAL LAY UP OF OVERWRAP OF PSII BEAM WITH E-GLASS CLOTH AND ROOM TEMPERATURE CURE POLYESTER RESIN

MATERIAL QUANTITIES:

| DESCRIPTION | QUANTITY |
|---|---|
| PSII beam section (rectangular profile about 2 inches × 4 inches - 0.16 inch thickness) | length >15" |
| 1522 E-glass plain weave fabric | 19 plies @ - 15" × 12" (15" dimension along warp) 3 plies @ - 16" × 13" (orient for best nesting) |
| Ashland Aropol 7240 T 15 room temperature cure polyester resin | 225 grams |
| MEKP-9 catalyst | 3 grams |
| perforated release film | 1 piece @ 16" × 13" |
| non-perforated release film | 1 piece @ 16" × 14" |
| felt breather | 1 piece @ 20" × 26" |
| bagging film | 1 piece @ 26" × 30" |
| bag sealant tape | ~56" |
| sheet metal caul plates | 2 @ 4" × 12" 2 @ 2" × 12" |

PREPARATION OF MATERIALS:
1-1. Lightly sand surface of PSII beam section with 180 grit sandpaper. With clean cloth and/or air clean off dust from sanding.
1-2. Cut plies of E-glass cloth and pieces of perforated release film, non-perforated release film, breather, and bagging fin to dimensions given in "MATERIAL QUAN-TITIES". Cut sheet metal caul plates and remove any burrs or sharp edges.
1-3. Dry fit the E-glass cloth and process materials around the PSII beam.
1-4. Cut two holes in the bagging film for two ports, one for the vacuum source and one for the gauge to measure vacuum pressure. The two vacuum ports should be located off of the PSII beam.
1-5. Lay down the bag sealant tape along the perimeter of approximately one half of the bag. Do not remove the film from the sealant tape.
1-6. Locate the two ports in the vacuum bag.
1-7. Lay down a piece of plastic film on a flat surface where wetting-out of the plies will occur.
1-8. Weigh out polyester resin in plastic container. Weigh out catalyst in a graduated cylinder. Add the catalyst to the resin and mix thoroughly.

LAY-UP PROCESS:
2-1. With PSII beam in holding fixture, brush a coat of resin on the PSII beam.
2-2. On the piece of plastic film brush the resin on one 15"×12" ply of E-glass cloth.
2-3. Wrap the ply all the way around the PSII beam. Squeegee (from the center toward the edges) the cloth to remove any entrapped air.
2-4. Repeat steps 2-2 and 2-3 until all 19 plies are applied to the PSII beam. The overlap or butt joint of each ply should be offset from the previous ply approximately 0.5".

VACUUM BAGGING AND CURE:
3-1. Wrap the perforated release film around the PSII/E-glass/polyester (hybrid) beam.
3-2. Wrap the three 16"×13" plies of E-glass cloth (bleeder) around the perforated release film.
3-3. Wrap the non-perforated release film around the bleeder.
3-4. Locate the four caul plates on each of the four faces of the beam and hold in place with tape.
3-5. Wrap the breather around the caul plates.
3-6. Remove the film from the bag sealant tape. Wrap the bagging film around the breather and squeeze the bag sealant tape to seal the bag.
3-7. Connect the vacuum source and draw vacuum. Check for leaks in vacuum bag and seal.
3-8. Cure at room temperature for 16 hours minimum.

Flexural testing was conducted according to the generic specifications set forth by ASTM D-790. The span length was 60 inches; loading rate was 0.35 in/min. Load versus displacement slopes were measured using an Instron 4505. In this manner, the load versus displacement slope, m, of the composite beam was measured to be 1278 lb/in.

Beam theory predicts the load slope, m, to be:

$$M = \frac{48EI}{L^3} \qquad \text{Equation 1}$$

wherein: E=the beam material flexural modulus, psi
I=moment of inertia of the beam, in$^4$
L=beam span length between supports, in Flexural modulus values of FIBREX™ and the fiberglass reinforced polyester (FRP) material prepared, as described, were measured in separate, independent experiments. These values were found to be 740,000 psi and 2,000,000 psi, respectively. The moments of inertia of the FIBREX™ and FRP layers (See FIG. 2) in this example are 1.273 in$^4$ and 2.073 in$^4$, respectively.

If there were no interaction between the two material layers, one would expect the load slope contribution from each to be additive:

$$M_{total} = M_{FIBREX} + M_{FRP} \quad \text{Equation 2}$$

$$= \frac{48(740,000)(1.273)}{(60)(60)(60)} + \frac{48(2,000,000)(2.073)}{(60)(60)(60)}$$

$$= 209 + 921$$

$$= 1130 \text{ lb/in}$$

The difference between the predicted load slope (1130 lb/hr) and the measured load slope (1278 lb/in) demonstrates an interaction between the composite layers.

Testing the adhesive bond in shear between the FIBREX™ and the fiberglass reinforced polyester (FRP) was completed according to ASTM D-3163. The crosshead speed used was 0.17 in/min and the bond area was 0.25 in$^2$. Loads in excess of 450 lbs. were applied to the bond. The corresponding minimum shear strength was calculated as follows:

$$t = \frac{P}{A}$$

where $P$ = max load (lb)

$A$ – bond area (in$^2$)

$$t = \frac{450.0 \text{ lb}}{0.25 \text{ in}^2} = 1800 \text{ psi}$$

The above specification, examples and data provide a complete description of the manufacture and use of the composition of the invention. Since many embodiments of the invention can be made without departing from the spirit and scope of the invention, the invention resides in the claims hereinafter appended.

We claim:

1. A composite structural member having a core and an intimately bonded exterior layer, said member comprising:
   (a) a thermoplastic linear extruded core comprising a polymer composite composition comprising a fiber reinforced thermoplastic resin; and
   (b) an exterior layer comprising a fiber-reinforced cured thermoset resin; wherein the core is a non-circular profile shape comprising a beam, a channel, a panel, a rail, a jamb, a stile, a sill, a track, a stop, a sash or combinations thereof.

2. The member of claim 1 wherein the core comprises a linear extrudate having a hollow square cross section with a wall thickness greater than 1 mm.

3. The member of claim 1 wherein the exterior layer covers the entire surface of the linear core.

4. The member of claim 1 wherein the exterior layer is placed on the core to provide reinforcement in a defined direction of applied stress.

5. The member of claim 1 wherein the core comprises an extruded thermoplastic composite comprising a minor proportion of polyvinyl chloride and a major proportion of a reinforcing cellulosic fiber.

6. The member of claim 5 wherein the thermoplastic polymer is present at a concentration of about 15 to 40 wt-% of the core.

7. The composite of claim 6 wherein the cellulosic fiber in a wood fiber with a particle size of about 0.3 mm to 10 mm and an aspect ratio of about 1 to 10.

8. The composite of claim 6 wherein the cellulosic fiber is a wood fiber with a length of about 0.3 mm to 3 mm and a width of 0.1 mm to 3 mm and an aspect ratio of about 2 to 7.

9. The member of claim 1 wherein the cured thermoset resin comprises an unsaturated polyester resin.

10. The member of claim 1 wherein the fiber of the exterior layer comprises glass fiber.

11. The member of claim 10 wherein there is about 20 to 40 wt-% of thermoset resin and about 80 to 60 wt-% of glass fiber in the exterior layer.

12. The member of claim 1 wherein the polymer composite composition comprises a fiber reinforced polyvinyl chloride.

13. A composite structural member having a core and an intimately bonded exterior layer, said member consisting of:
   (a) a thermoplastic linear extruded core comprising a thermoplastic polymer resin; and
   (b) an exterior layer comprising a fiber-reinforced cured thermoset resin; wherein the core is a non-circular profile shape comprising a beam, a channel, a panel, a rail, a jamb, a stile, a sill, a track, a stop, a sash or combinations thereof.

14. The member of claim 13 wherein the core comprises a linear extrudate having a hollow square cross section with a wall thickness greater than 1 mm.

15. The member of claim 13 wherein the exterior layer covers the entire surface of the linear core.

16. The member of claim 13 wherein the exterior layer is placed on the core to provide reinforcement in a defined direction of applied stress.

17. The member of claim 13 wherein the cured thermoset resin comprises an unsaturated polyester resin.

18. The member of claim 13 wherein the fiber of the exterior layer comprises glass fiber.

19. The member of claim 18 wherein there is about 20 to 40 wt-% of thermoset resin and about 80 to 60 wt-% of glass fiber in the exterior layer.

20. The member of claim 13 wherein the polymer composite composition comprises a fiber reinforced polyvinyl chloride.

21. The member of claim 2, further comprising an internal structural web wherein the structural web provides increased structural strength.

22. The member of claim 1, further comprising a fastener support suitable for receiving a fastener useful in assembling a structure.

23. The member of claim 1, wherein the member is joined to a mating surface of a second member by fusing the mating surfaces to form a welded joint.

24. The structural member of claim 1, wherein the flexural modulus is greater than 740,000 psi.

25. The structural number of claim 1, wherein the beam is a box beam or an I-beam.

26. The structural member of claim 1, wherein the beam is a framing member.

* * * * *